T. F. METCALFE.
Gate.

No. 221,590. Patented Nov. 11, 1879.

Witnesses:
J. W. Garner
Wm. W. Mortimer

Inventor:
T. F. Metcalfe,
per
F. A. Lehmann,
Atty.

UNITED STATES PATENT OFFICE.

THOMAS F. METCALFE, OF CHESTERFIELD, ILLINOIS.

IMPROVEMENT IN GATES.

Specification forming part of Letters Patent No. 221,590, dated November 11, 1879; application filed September 17, 1879.

*To all whom it may concern:*

Be it known that I, THOMAS F. METCALFE, of Chesterfield, in the county of Macoupin and State of Illinois, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the arrangement and combination of devices, which will be more fully described hereinafter, whereby the gate is readily opened and closed at a distance from it.

Figure 1:
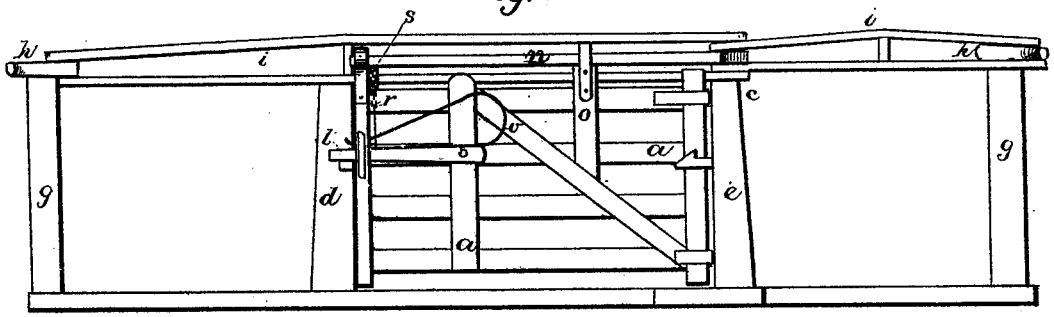
Figure 2:
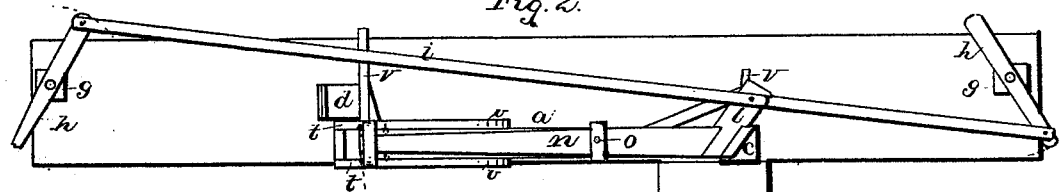
Figure 3:
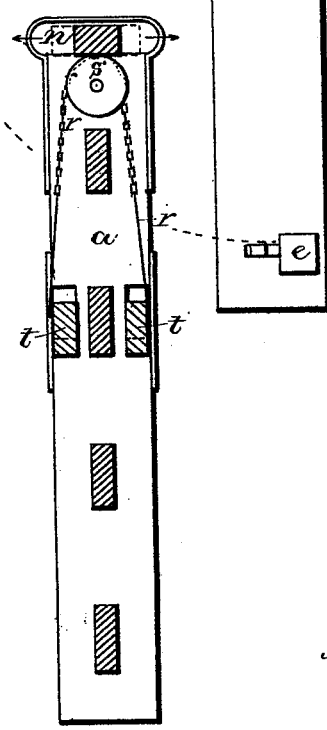

Figure 1 is a side elevation of my invention. Fig. 2 is a plan view of the same. Fig. 3 is a vertical cross-section of the gate alone.

$a$ represents a gate of any suitable construction; $c$, the post to which it is hinged; $d$, the post against which it closes; $e$, the post against which it is held when open, and $g$ the posts upon which the hand-levers $h$ are pivoted. All of these parts may be arranged and constructed in any desired manner, as they form no special part of my invention.

The hand-levers $h$ are connected at their shorter ends by the double connecting-rods $i$ with an arm, $l$, which projects backward from the rear end of the lever $n$ on top of the gate.

Secured to the gate, at any suitable point and in any desired manner, is the standard $o$, upon the top of which the lever $n$ is pivoted. The front end of this lever extends forward over the free end of the gate, and has secured to its under side, just back of its end, the chain, wire, or other equivalent device, $r$, which passes over the pulley $s$, and extends down along each side of the gate to the two latches, $t$, to which the two ends are fastened. Upon the top of each latch is placed a suitable spring, $v$, which keeps the latch always pressed downward when it is free to move. One of these latches holds the gate against the post $d$ when the gate is closed, and the other against the post $e$ when open. These two latches being thus connected to the long end of the lever $n$, every time the lever $n$ is moved by the hand-lever, either for the purpose of opening or closing the gate, the lever first, by its sidewise movement at its free end, lifts one of the latches, and then swings the gate around.

Instead of using wires for connecting the hand-levers with the lever $n$ on top of the gate, wooden rods are here used, not only because they do not give, but because the cattle and stock are not liable to run into them, as they do into the wires. To prevent these rods from sagging down or being too heavy to move, supports $v$ are secured to posts $c\ d$ for the rods to rest upon.

Having thus described my invention, I claim—

The combination of the gate $a$, having the lever $n$ pivoted upon its top, with the chains $r$, roller $s$, latches $t$, posts $d\ e$, and the levers and connecting-rods for operating the lever $n$, one of the latches being made to catch on the post $d$ and the other on the post $e$, substantially as shown.

In testimony that I claim the foregoing I have hereunto set my hand this 11th day of September, 1879.

THOMAS FRANCIS METCALFE.

Witnesses:
 JNO. H. PRITCHETT,
 T. B. RICE.